UNITED STATES PATENT OFFICE.

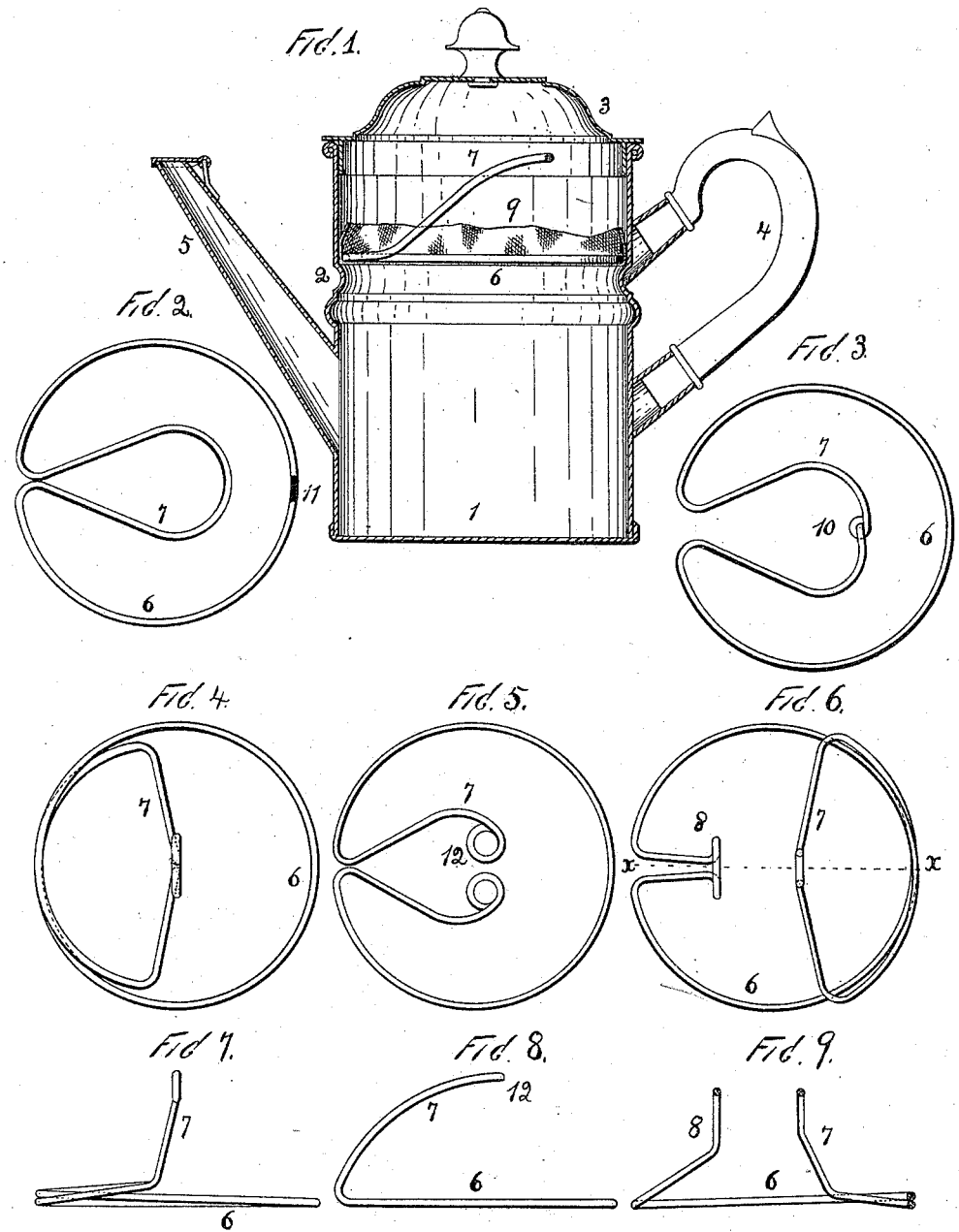

JOHN TOBIN, OF NEWARK, NEW JERSEY, ASSIGNOR TO THE JOHN TOBIN MANUFACTURING COMPANY, OF SAME PLACE.

COFFEE-POT.

SPECIFICATION forming part of Letters Patent No. 526,331, dated September 18, 1894.

Application filed April 16, 1894. Serial No. 507,661. (No model.)

*To all whom it may concern:*

Be it known that I, JOHN TOBIN, a citizen of the United States, residing at Newark, Essex county, State of New Jersey, have invented a new and useful Improvement in Coffee-Pots, of which the following is a specification.

My invention relates especially to devices employed for making "drip coffee," and has for its object the provision of a simple, cheap and effective coffee pot, wherein a special bag is dispensed with, and wherein ready means are employed for inserting, holding and removing the strainer.

To attain the desired end, my invention consists essentially in certain novel and useful combinations or arrangements of parts, and peculiarities of construction and operation, all of which will be hereinafter first fully described, and then pointed out in the claims.

In the accompanying drawings, Figure 1 is a vertical, central sectional view of a coffee pot embodying my invention. Fig. 2 is a plan view of the strainer holder, shown in Fig. 1. Figs. 3, 4, 5, and 6 are plan views of modified forms of strainer holder. Fig. 7 is a side elevation of the holder shown in Fig. 4, and Fig. 8 is a like view of the holder shown in Fig. 5. Fig. 9 is a sectional view of Fig. 6 at line $x$—$x$.

Like numerals of reference, wherever they occur, indicate corresponding parts in all the figures.

1 is the body of the coffee pot made of any approved material, and preferably with a bead, 2. 3 is the cover; 4, the handle, and 5 the spout.

6 is a wire ring having an inward and upward curved portion 7, (Figs. 1 and 2.)

9 is a disk or circular piece of cloth, forming the strainer. In placing the strainer in position, the cloth is laid upon the top of the open pot. The hand now grasps the handle 7, compressing the ring, so as to readily slip into the pot, carrying the cloth with it. When in proper position, the hand is removed, the ring expands, pressing against the wall of the pot, tightly stretching the strainer cloth 9, and holding it in position to receive the finely powdered coffee. In removing the strainer, the hand piece 7 forms a handle for easy manipulation. No sewed or carefully made bag is required in this construction, and no preparation of any kind is necessary in making the strainer, which may be readily washed, if desired, and a new one substituted at a trifling expense.

In the modification of strainer holder shown in Fig. 3, the wire is simply hooked together at 10, instead of being united, as at 11, Fig. 2. In Figs. 4 and 7, the ring of the holder 6 is doubled a short distance before it is formed into the hand piece. In Figs. 5 and 8 the ends of the wire of which the holder is made, are simply bent into rings 12, in the handle. In Figs. 6 and 9 the material at one side is shaped as in Figs. 4 and 7, and is also formed into a loop, 8, at the other side, the parts 7 and 8 being grasped between the fingers when the holder is being placed in, or removed from the coffee pot.

Having now fully described my invention, what I claim as new therein, and desire to secure by Letters Patent, is—

1. A strainer holder for coffee pots, which consists of a piece of spring metal, bent to conform to the shape of the body of a coffee pot, having its ends united, and having an integral loop or handle for compressing the same, substantially as shown and described.

2. The combination with a coffee pot, of a strainer cloth therefor extending across the same at a suitable distance below the top, and a compressible ring provided with an integral handle and expanded within the pot and holding between it and the body of the pot the edges of the strainer cloth, substantially as shown and described.

JOHN TOBIN.

Witnesses:
THOMAS RING,
A. M. PIERCE.